United States Patent
Pai et al.

(10) Patent No.: US 9,065,288 B2
(45) Date of Patent: Jun. 23, 2015

(54) CURRENT COMPENSATION MODULE, CHARGING APPARATUS, AND CHARGING APPARATUS CONTROLLING METHOD

(71) Applicant: LITE-ON CLEAN ENERGY TECHNOLOGY CORP., Taipei (TW)

(72) Inventors: Kai-Jen Pai, Taipei (TW); Chu-Chung Hsieh, Taipei (TW); Ming-De Chien, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 274 days.

(21) Appl. No.: 13/872,627

(22) Filed: Apr. 29, 2013

(65) Prior Publication Data

US 2014/0152270 A1 Jun. 5, 2014

(30) Foreign Application Priority Data

Dec. 3, 2012 (TW) .............................. 101145306 A (51) Int. Cl.
*H02J 7/06* (2006.01)
*H02J 7/00* (2006.01)
*H01M 10/44* (2006.01)
*H02J 7/04* (2006.01)
*H02M 1/36* (2007.01)

(52) U.S. Cl.
CPC ........... *H02J 7/0052* (2013.01); *H01M 10/446* (2013.01); *H02J 7/0083* (2013.01); *H02J 7/045* (2013.01); *H02M 1/36* (2013.01)

(58) Field of Classification Search
USPC ........................................................ 320/164
See application file for complete search history.

(56) References Cited

U.S. PATENT DOCUMENTS

| | | | | |
|---|---|---|---|---|
| 5,818,202 | A * | 10/1998 | Miyamoto et al. ............ | 320/125 |
| 5,880,947 | A | 3/1999 | Imanaka et al. | |
| 5,963,025 | A * | 10/1999 | Colli ............................. | 323/288 |
| 6,075,339 | A * | 6/2000 | Reipur et al. .................. | 320/110 |
| 6,184,652 | B1 * | 2/2001 | Yang ............................. | 320/110 |
| 6,218,805 | B1 * | 4/2001 | Melcher ........................ | 320/105 |
| 6,424,123 | B1 * | 7/2002 | Odaohhara et al. ........... | 320/134 |
| 7,830,683 | B2 | 11/2010 | Sakakibara | |
| 2011/0248670 | A1 | 10/2011 | Yamazaki et al. | |
| 2012/0043934 | A1 | 2/2012 | Klein | |
| 2012/0086423 | A1 | 4/2012 | Dao et al. | |

FOREIGN PATENT DOCUMENTS

| | | |
|---|---|---|
| CN | 102377216 A | 3/2012 |
| TW | 201249058 A | 12/2012 |
| WO | WO 2008/103465 A1 | 8/2008 |

* cited by examiner

*Primary Examiner* — Yalkew Fantu
(74) *Attorney, Agent, or Firm* — Muncy, Geissler, Olds & Lowe, P.C.

(57) ABSTRACT

A current compensation module, a charging apparatus, and a charging apparatus controlling method are disclosed. The current compensation module is used for controlling an outputted charging current in order to charge a battery module. The current compensation module includes a transition unit, a proportional controlling unit, and an integral controlling unit. The transition unit allows an internal signal of the current compensation module increasing from a first voltage. When the internal signal attains to a second voltage, the proportional controlling unit will output a proportional controlling signal to adjust the charging current. When the charging current attains to a rated output current, the integral controlling unit incorporates with the proportional controlling unit to output a proportional-integral controlling signal in order to control and adjust the charging current for the battery module, and to suppress the output overshoot current of the charging apparatus.

22 Claims, 8 Drawing Sheets

CURRENT COMPENSATION MODULE, CHARGING APPARATUS, AND CHARGING APPARATUS CONTROLLING METHOD

BACKGROUND OF THE INVENTION

1. Field of the Invention

The present invention relates to a current compensation module, a charging apparatus, and a charging apparatus controlling method thereof, particularly to a current compensation module, a charging apparatus, and a charging apparatus controlling method adopting a transition unit which is appended to the current compensation module in the charging apparatus application.

2. Description of the Related Art

Due to the impact of the greenhouse effect, employing clean energies have been gradually regarded in recent years. In order to alleviate greenhouse gas emissions, and then to supply the driving power to electric power equipment and electric vehicles, the rechargeable battery plays a critical role in the development of clean energies. Nowadays, the popular rechargeable batteries include Lead-Acid, Ni—Cd, Ni-MH, and Lithium ion (Li-ion) batteries, and these batteries can be found in various applications, such as powered forklifts, pallet trucks, and stacker. With regards to both energy and power density of a rechargeable battery, the lead-acid battery, the nickel cadmium battery, or the nickel hydrogen battery are all proven to be smaller than that of the Li-ion battery. Therefore, the Li-ion battery has become a better selection of a power source in the electric vehicle applications.

Compared to other rechargeable batteries, the Li-ion battery has the higher energy and power density and its application ranges have progressively extended from the portable electronic products to electric vehicles. However, due to the ever-increased capacious Li-ion battery should be implemented, the applied Li-ion battery pack has to be charged by a fast charger because it is hoped that the battery pack can be fully charged in a short time. Furthermore, a charging apparatus tends to provide either a constant voltage or a constant current to fulfill the purposed charging strategy for rechargeable batteries. Therefore, an inner circuit of the charging apparatus adopting a voltage compensative loop and a current compensative loop can be found in conventional art, so as to control the operations of the constant output voltage or constant current output to achieve the charging of the battery module.

Figure 1A:
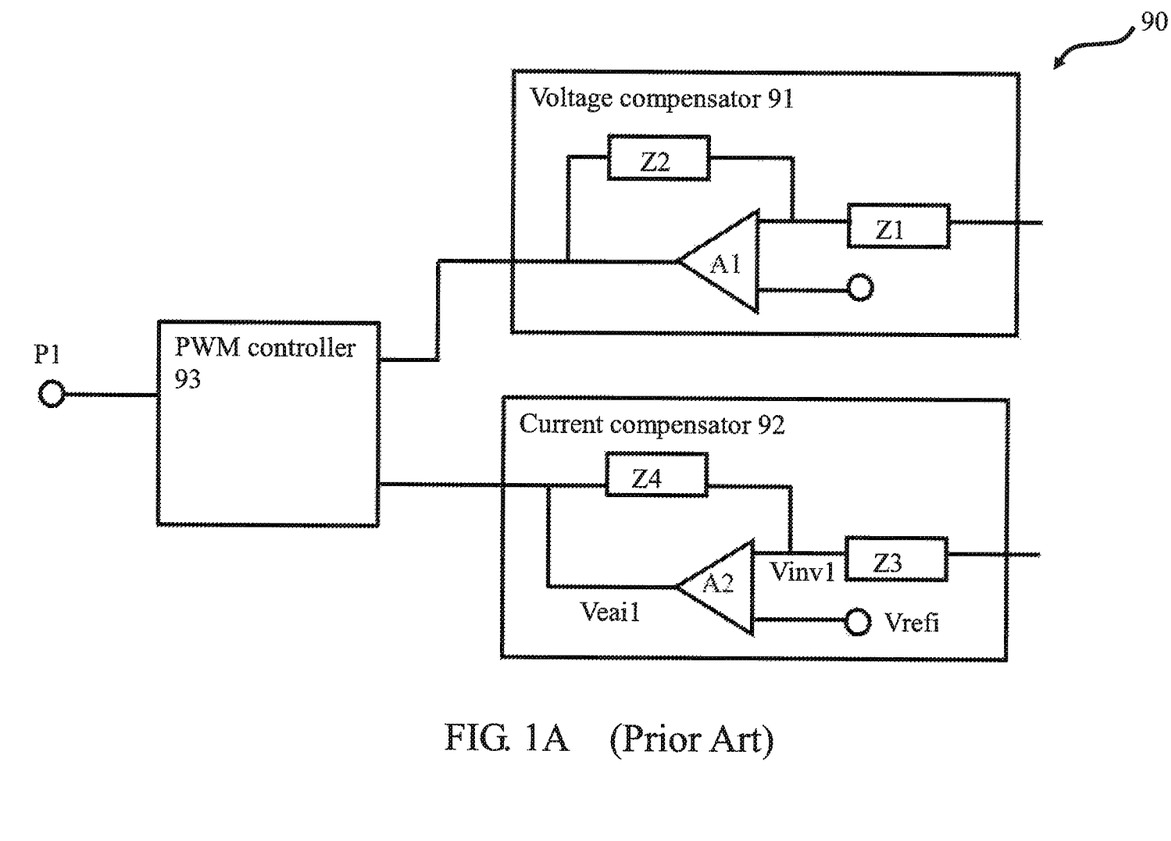
FIG. 1A is a circuit diagram for the prior art that shows the inner controlling circuit of the charging apparatus.

Herein, please refer to FIG. 1A, which is the prior art of the inner controlling circuit for the charging apparatus.

The inner controlling circuit 90 of the charging apparatus in the prior art comprises a voltage compensator 91, a current compensator 92, and a PWM controller 93, wherein the voltage compensator 91 comprises an error amplifier A1 with the compensative components Z1 and Z2; the current compensator 92 comprises an error amplifier A2 with the compensative components Z3 and Z4. According to respective error-signals, which are from the output side of the voltage compensator 91 and the current compensator 92, the PWM controller 93 can be respectively controlled by a voltage compensator or a current compensator, and then the PWM controller can output the PWM signal P1 to control the charging apparatus. Before being operated in a constant-current (CC) output mode, as a charging apparatus is still in the start-up phase, its operations of the output voltage Vo, the output current Io, the inverting terminal voltage Vinv1 and the output terminal voltage Veai1 of the error amplifier A2 in the inner controlling circuit 90 of the charging apparatus are shown in FIG. 1B.

Figure 1B:
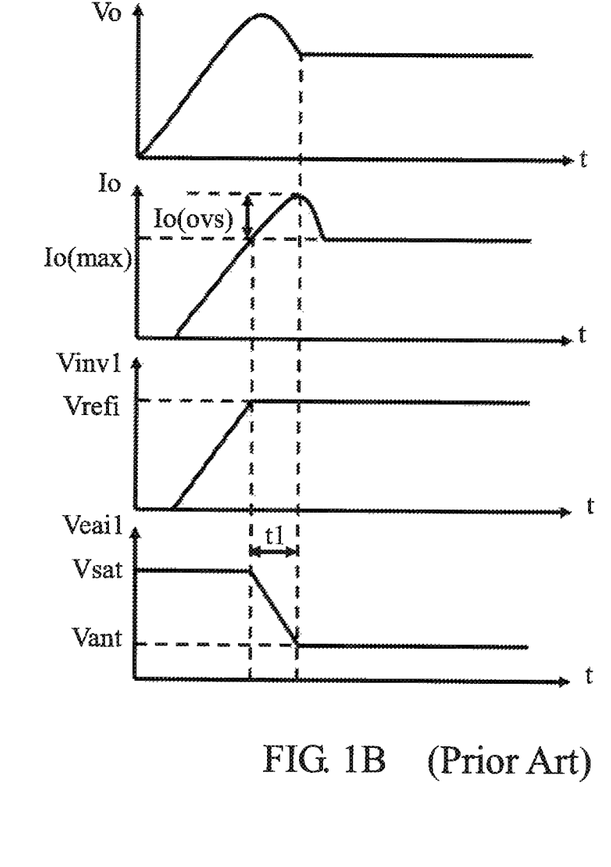
FIG. 1B is a waveform diagram for the prior art that illustrates the output power and the control signals of the charging apparatus.

FIG. 1B that is the prior art illustrates the waveform diagram of the output power and the control signals on the charging apparatus.

The inverting terminal voltage Vinv1 varies with the output current Io in direct proportion, and when Vinv1 is lower than the current reference command Vrefi, the error amplifier A2 is not operated in the feedback condition, and then the Veai1 will be sustained at a positive saturated voltage Vsat. With the ever-increased output current Io, when it exceeds over a maximum rated output current Io(max), the error amplifier A2 will be operated in feedback condition. As a result, the inverting terminal voltage Vinv1 can be clamped to equal the current reference command Vrefi. However, due to the output terminal voltage Veai1 which can not be rapidly clamped to the anticipative voltage Vant for the purpose of the constant-current output operation. For this reason, the charging apparatus will result and output an overshoot current Io(ost) during the delay time t1. Due to this overshoot current exceeds the specification of the rated output current, and it can damage the charging apparatus if this overshoot current is not suppressed.

In the "Current control type converter" of U.S. Pat. No. 7,830,683 ('683), the output voltage and current overshoot can be suppressed in the start-up phase of the power conversion apparatus is disclosed, in which the deviation detecting section is employed to detect an error value between the output voltage of the power apparatus and a reference voltage, and it can be used to determine whether the power conversion apparatus has achieved the start-up process. When the power conversion apparatus has completed its start-up process, the deviation detecting section outputs a signal, which calls the "completion of startup" to inform a control switchover section, then the compensator's operation on the control circuit of the power conversion apparatus will be switched from the proportional control mode to the proportional-integral control mode. As a result, the voltage or current output overshoot in the start-up phase of this apparatus can be suppressed. However, the system disclosed in U.S. Pat. No. 7,830,683 ('683) that needs to calculate the error value through the deviation detecting section to determinate the operative conditions for the power conversion apparatus. Then, a control switchover section receives a "completion of startup" signal from the deviation detecting section, so as to control to the compensators that its operations can be switched to a proportional calculation or a proportional-integral calculation. According to aforementioned methods, the drawbacks are revealed as follows:

First of all, it is complex that both the circuit structure and the control process; therefore, with regard to the research and development of productions is adverse. Second of all, the product cost cannot be effectively reduced because these controlling schemes and functions have to be realized depending on the bulky hardware circuits.

Therefore, in order to retrieve the drawbacks of the prior art, the applicants contemplate concerning the ameliorative innovation, to improve the aforementioned deficiencies and devise a current compensation module, a charging apparatus, and a charging apparatus controlling method to solve these absences of the prior art.

SUMMARY OF THE INVENTION

It is the main objective of the present invention that provides a current compensation module, which possesses a transition unit to implement the clamping control, and that to achieve the purpose of the output overshoot current suppression for the charging apparatus.

It is another objective of the present invention that provides a charging apparatus having the current compensation module aforementioned.

It is another objective of the present invention that provides a charging apparatus controlling method.

In order to achieve the objectives as mentioned above, a current compensation module outputs a control signal, then to input a driving circuit in the charging apparatus, so as to adjust and control the output current of the power conversion module, and the output current equals to the charging current of the charging apparatus for charging a battery module, wherein when the charging apparatus outputs the charging current in the start-up phase, there have a first start-up phase, a second start-up phase, and a third start-up phase for the charging apparatus operations. The current compensation module comprises a transition unit, a proportional controlling unit, and an integral controlling unit. The transition unit has a function for a clamping control, wherein when the charging apparatus is operated in the first start-up phase, and it outputs the charging current. An internal signal of the current compensation module can implement a clamping control through this transition unit; as a result, the internal signal will be clamped at a first voltage in the first start-up phase. The proportional controlling unit is electrically connected to the transition unit, wherein when the internal-signal voltage attains to a second voltage, and the charging current is still lower than the rated charging current, the current compensation module of the charging apparatus operates in the second start-up phase; meanwhile, the proportional controlling unit outputs a proportional controlling signal, which inputs the driving circuit to control the power conversion module. The integral controlling unit with the transition unit is electrically connected the proportional function controlling unit, wherein when the charging current attains to a rated output current, the current compensation module of the charging apparatus operates in the third start-up phase, thus the integral controlling unit through the transition unit incorporates with proportional controlling unit to output a proportional-integral controlling signal. According to this operation principle, first of all, the power conversion module can be controlled by the current compensation module through the driving circuit. Second of all, the output current of the power conversion module can be operated in a constant-current output mode to charge the battery module. Ultimately the output overshoot current of the power conversion module in the start-up phase can be suppressed by this proposed current compensation module.

A power input terminal can obtain an AC or a DC power to supply a power for the power conversion module in order to convert a charging power to charge a battery module, wherein when the charging apparatus outputs the charging current in the start-up phase, there have a first start-up phase, a second start-up phase, and a third start-up phase. The charging apparatus comprises a power conversion module, a driving circuit, and a current compensation module. The power conversion module is electrically connected to the power input terminal to obtain an AC or a DC power to convert the charging power for charging the battery module. The current compensation module is electrically connected to the driving circuit, whose output side of the driving circuit is electrically connected to the power conversion module, wherein the current compensation module is employed to output a control signal to adjust and control the output current of the power conversion module through the driving circuit. The current compensation module comprises a transition unit, a proportional controlling unit, and an integral controlling unit. The current compensation module can be operated in a clamping condition by the transition unit, wherein when the charging apparatus is operated in the first start-up phase; meanwhile, the transition unit is employed to clamp the internal-signal voltage at a first voltage, and the first voltage will be elevated because the output current of the power conversion module is increased gradually.

The integral controlling unit is electrically connected to the transition unit, wherein when the internal-signal voltage attains to a second voltage, and that the charging current is lower than a rated output current of the power conversion module, the charging apparatus operates in the second start-up phase; meanwhile, the proportional controlling unit outputs a proportional controlling signal, so as to adjust and control the output current of the power conversion module through the driving circuit.

The proportional controlling unit is electrically connected to the integral controlling unit and the transition unit, wherein when the charging current attains to the rated output current of the power conversion module, the current compensation module operates in the third startup phase; meanwhile, the integral controlling unit incorporates with the proportional controlling unit to output a proportional-integral control signal. Therefore, the power conversion module through the driving circuit can be adjusted and controlled by the proportional-integral control signal. Finally, the charging apparatus can be operated in the CC output mode, and it can charge the battery module using this constant current.

In order to adjust and control a power conversion module, a current compensation module based on a charging apparatus controlling method in a charging apparatus can be applied for charging the battery module. This charging apparatus controlling method includes several steps as follows: inputting power to the charging apparatus; operating the clamp control in the first start-up phase, an internal-signal voltage will gradually elevate its voltage level from a first voltage; when the increased internal-signal voltage attains to a second voltage, and the charging current is still lower than the rated output current of the power conversion module, a current compensation module is operated in the second start-up phase to output a proportional controlling signal to adjust and control the output current; when the charging current attains to a rated output current of the power conversion module, a current compensation module is operated in the third-startup phase. Finally, a current compensation module outputs a proportional-integral controlling signal, which can control the power conversion module to output a constant current for charging the battery module.

DETAILED DESCRIPTION OF THE PREFERRED EMBODIMENTS

The aforementioned and other objectives, features, and advantages for the present invention will be apparently mentioned and explained from the following detailed descriptions when taken in conjunction with the accompanied drawings.

Figure 2:
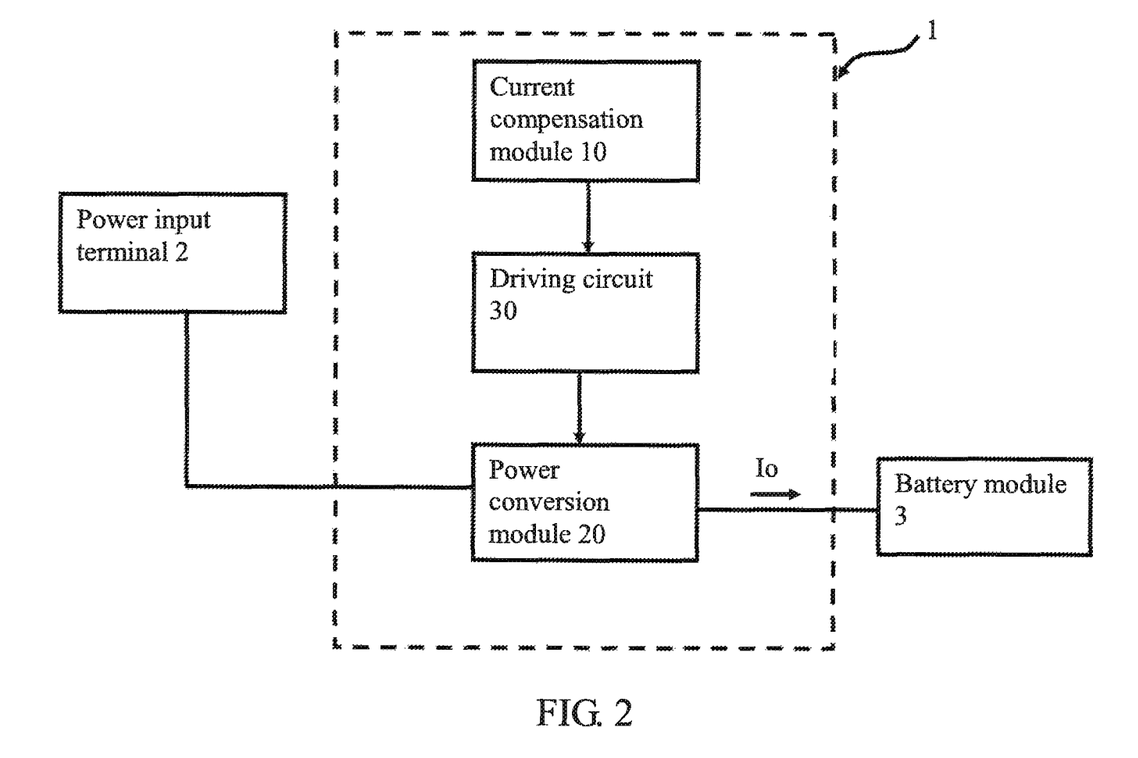
FIG. 2 is a block diagram which shows the basic configuration of the charging apparatus for the present invention.

Please refer to FIG. 2, which is a block diagram of the charging apparatus for the present invention.

Figure 4:
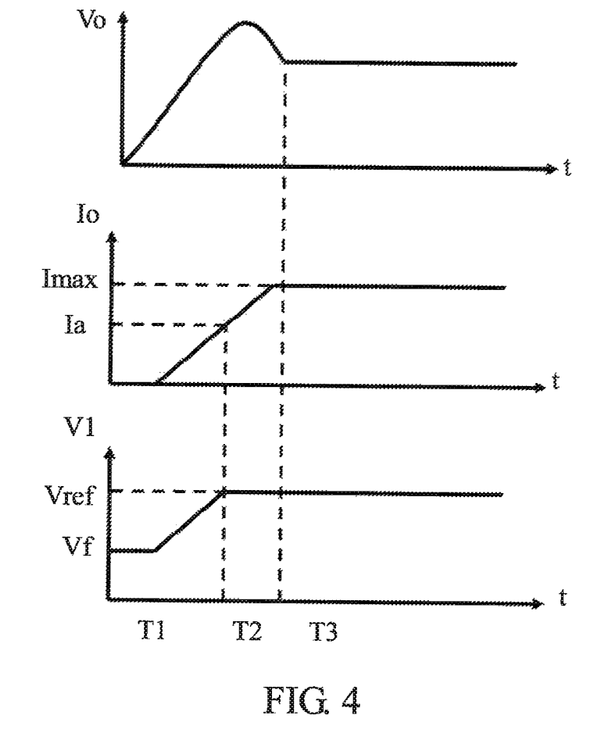
FIG. 4 is a waveform diagram which shows the output power and the control signal of the charging apparatus for the present invention.

A charging apparatus 1 of the present invention obtains an electric power from a power input terminal 2, so as to convert a required charging power for a battery module 3 through a power conversion module 20. Moreover, the battery module 3 can be a rechargeable battery, such as the Li-ion battery, but its categories are not limited by Li-on batteries. The power input terminal 2 can input an AC or a DC power, and that the present invention does not limit to the input power of the power input terminal. As the AC or the DC power inputs to the power conversion module 20, which can converter the power by an internal conversion circuit (not shown in FIG. 2); as a result, the battery module 3 obtains a required charging power to achieve the battery charging. In the embodiment of the present invention, the charging apparatus 1 comprises a current compensation module 10, a power conversion module 20, and a driving circuit 30. The driving circuit 30 is employed to control and drive the power conversion module 20 because it can receive a control signal that is outputted from the current compensation module 10. However, due to the driving circuit 30 is not the focus of improvements for the present invention, so it will not be explained further. The power conversion module 20 is employed to receive the input power from the power input terminal 2, and to convert the required charging voltage Vo and the charging current Io (as shown in FIG. 4) for charging the battery module 3. The current compensation module 10 is employed to output the control signal, and then to transmit this control signal through the driving circuit 30 to the power conversion module 20. Therefore, using a feedback loop, the output current Io which is outputted from the power conversion module 20 can be controlled and compensated during the operations of the start-up and steady-state phase for the charging apparatus 1. The inside circuits of the charging apparatus 1 can also be equipped with a voltage compensation module (not shown in FIG. 2) to control the output voltage Vo of the power conversion module 20. However, due to the voltage compensation module is not the focus of improvements for the present invention, so it will not be explained further.

Figure 3:
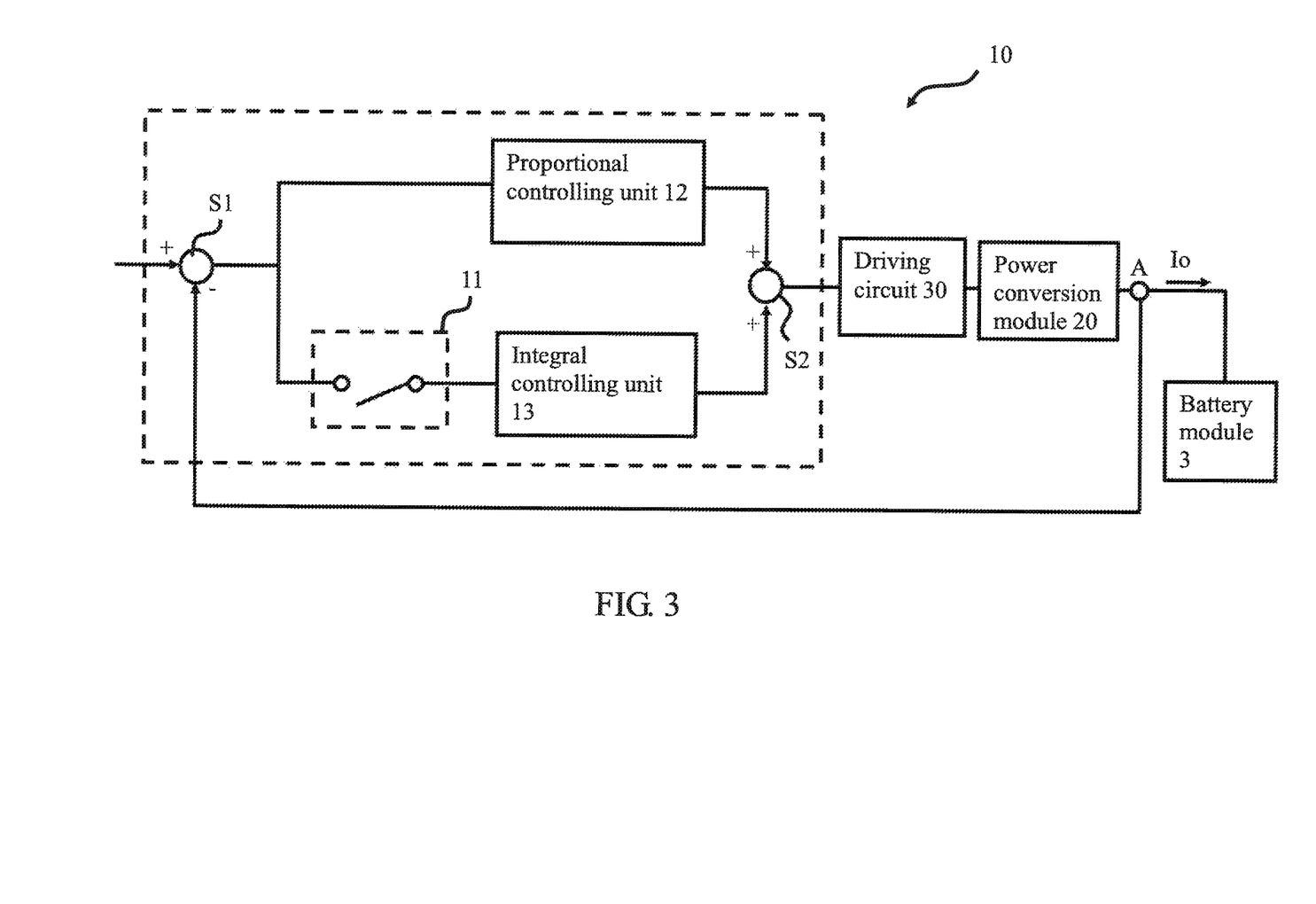
FIG. 3 is a diagram which is the first embodiment of the current compensation module for the present invention.

Please refer to FIG. 3, which is the diagram of the first embodiment of the current compensation module for the present invention, and please also refer to FIG. 4, which is a waveform diagram of the output power and the control signal in the charging apparatus for the present invention.

In the first embodiment of the present invention, the current compensation module 10 is the feedback compensator, which can be either implemented by an analog circuit or a digital-control scheme, but its implementations in the present invention is not limited hereto. In order to fulfill the control and compensation for the charging current based on the current compensation module 10, the operations of the charging apparatus 1 that has a first start-up phase T1, a second startup phase T2, and a third start-up phase T3 in the start-up phase will be discussed later. The current compensation module 10 comprises a transition unit 11, a proportional controlling unit 12, an integral controlling unit 13, and conjunction points S1 and S2. The transition unit 11 may be a diode, but the present invention is not limited hereto. According to characteristics of the transition unit 11 and the operation principle of the current compensation module 10, there has a operation of the clamping control in the start-up phase, particularly, when the charging apparatus 1 in the first start-up phase T1 starts to output the charging current Io, the initial voltage of the internal signal in the current compensation module 10 will make the internal-signal voltage V1 to clamp at a first voltage Vf, wherein the first voltage Vf can be sustained based on the transition unit's operative characteristics and the circuit principle of the current compensation module 10. Besides, the initial first voltage Vf can be clamped and adjusted using the different transition unit 11. Along with the gradually increased charging current Io, the internal-signal voltage V1 is also increased from the first voltage Vf. In addition, when the charging current Io is still lower than the rated output current Imax of the power conversion module 20, the transition unit 11 operates in a cut-off condition based on its operative characteristics and the circuit principle of the current compensation module 10. When the charging current Io attains to a first current Ia, the charging apparatus 1 operates in the second start-up phase T2; meanwhile, the internal-signal voltage V1 attains to the second voltage Vref, and that the transition unit 11 can be still operated in the cutoff condition. So when the charging current Io attains to the rated output current Imax of the power conversion module 20, the charging apparatus 1 starts the operations in the third start-up phase T3; meanwhile, the transition unit 11 is operated in the cut-in condition based on its operative characteristics and the circuit principle of the current compensation module 10.

The integral controlling unit 13 is connected to the transition unit 11 in series. In the first start-up phase T1 of the charging apparatus 1, the transition unit 11 operates in the cut-off condition. With the charging current Io elevating, the internal-signal voltage V1 is gradually increased from the first voltage Vf. When the internal-signal voltage V1 attains to the second voltage Vref, the charging apparatus 1 operates in the second start-up phase T2; in the second start-up phase T2, the charging current Io is still lower than the rated output current Imax of the power conversion module 20, the internal-signal voltage V1 is sustained in the second voltage Vref, because the current compensation module 10 operates in the feedback condition; meanwhile, the current compensation module 10 only uses the proportional controlling unit 12 to control the power conversion module 20 through the driving circuit 30. The output current Io of the power conversion module 20 has to be detected at the point A, and then to input to the conjunctional point S1, so as to establish a feedback loop. According to this feedback loop, the proportional controlling unit 12 outputs a proportional controlling signal to control and adjust the output current Io of the power conversion module 20. With the increased charging current Io that attains to the rated output current Imax, the charging apparatus 1 operates in third start-up phase 13, and the transition unit 11 is operated in the cut in condition based on its operative characteristics and the circuit principle of the current compensation module 10; therefore, the integral controlling unit 13 incorporates with the proportional controlling unit 12, and the integral controlling and proportional controlling signals are able to go through the conjunctional points S2 to output a proportional controlling signal or a proportional-integral controlling signal, so as to control the power conversion module 20 through the driving circuit 30. According to abovementioned flows, the proportional controlling unit 12 incorporates with the integral controlling unit 13 to output a proportional-integral controlling signal through the driving circuit 30 to control the output current Io of the power conversion module 20, and the charging apparatus 1 can output a constant current that is maintained at the rated output current Imax. In addition, the output overshoot current in the start-up phase has been suppressed due to the current compensation module 10 employed the clamping control, the proportional control, and the proportional-integral control.

In the start-up phase, the output voltage Vo and the output current Io of the charging apparatus 1 is shown in FIG. 4. From the first start-up phase T1 to the third start-up phase T3, the output current Io of the power conversion module 20 will be increased following the elevated output voltage Vo. The transition unit 11 and the proportional controlling unit 12 in the current compensation module 10 make the initial voltage of the internal signal, which can be clamped in the first voltage Vf. Moreover, when the internal signal voltage V1 attains to the second voltage Vref, the current compensation module 10 is operated by the proportional controlling unit 12 to output a proportional controlling signal; according to characteristics of the transition unit 11 and the operation principle of the current compensation module 10, the transition unit 11 is operated in cut-off condition during the first and second start-up phase. Finally, in third start-up phase, the current compensation module 10 operates conditions that can be changed from the proportional control to the proportional-integral control, because the transition unit 11 is operated in the cut-in condition based on its operative characteristics and the circuit principle of the current compensation module 10. Therefore, the power conversion module 20 allows outputting a rated output current Imax, which is a constant current to charge the battery module 3. In addition, the output overshoot current of the power conversion module 20 can be suppressed in the start-up phase due to the aforementioned controlling processes and methods are employed.

Hereinafter please refer to FIG. 5, which is the flowchart of the first embodiment of the charging apparatus controlling method for the present invention. It should be noticed that although the current compensation module 10 in the charging apparatus 1 above is employed as an example for illustrating the charging apparatus controlling method in the present invention, the present method is not limited to using the aforementioned current compensation module 10 and its charging apparatus 1.

First of all, the apparatus performs Step 501: inputting power to the charging apparatus.

When the charging apparatus 1 operates in the start-up phase, an AC or a DC power that is from the power input terminal 2 can input to the power conversion module 20. The power conversion module 20 outputs the charging power, which includes the charging voltage Vo and the charging current Io for charging the battery module 3.

Second of all, the apparatus performs Step 502: operating a clamp control in the first start-up phase to enable an internal-signal voltage being elevated from a first voltage.

In the first start-up phase T1, the charging apparatus 1 starts to output the charging current Io, and its current compensation module 10 is operated in a clamping control condition, because the transition unit 10 can be operated in the cut-off condition based on its operative characteristics and the circuit principle of the current compensation module 10. With the output current Io elevated, the initial voltage of the internal signal in the current compensation module 10 starts increasing from the first clamping voltage Vf.

Third of all, the apparatus performs Step 503: when the internal-signal voltage increases attains to a second voltage, and the charging current is still lower than the rated output current, the current compensation module operates in the second start-up phase to output a proportional controlling signal to adjust and control the charging current.

The internal-signal voltage V1 will increase along with the charging current Io elevated, the charging apparatus 1 can be operated in the second start-up phase T2, because the internal-signal voltage V1 in the current compensation module 10 is increased from the first voltage Vf to the second voltage Vref. In the second start-up phase T2, the output current Io of the power conversion module 20 is still lower than its rated output current Imax; therefore, the transition unit 11 is operated in the cut-off condition that allows the current compensation module 10 to perform the proportional control by the proportional controlling unit 12. Therefore, a proportional controlling signal through the driving circuit can control and adjust the output current Io of the power conversion module 20.

Fourth of all, the apparatus performs Step 504: when the charging current attains to the rated output current, the current compensation module operates in the third-startup phase, and the transition unit operates in the cut-in condition.

When the output current Io increases to its rated output current Imax, the charging apparatus 1 operates in the third start-up phase T3, the transition unit 11 is operated in the cut-in condition based on its operative characteristics and the circuit principle of the current compensation module 10.

Finally, the system performs Step 505: outputting a proportional-integral controlling signal to control and adjust the power conversion module to output a constant current for charging the battery module.

When the transition unit 11 is operated in the cut-in condition, the integral controlling unit 13 incorporates with the proportional controlling unit 12 to output a proportional-integral controlling signal through the conjunction points S2, so as to implement the proportional-integral control process. Therefore, the current compensation module 10 outputs a proportional-integral controlling signal to control and adjust the power conversion module 20 for its steady-state operation, also in order to supply a constant charging current Io for charging the battery module 3.

Figure 5:
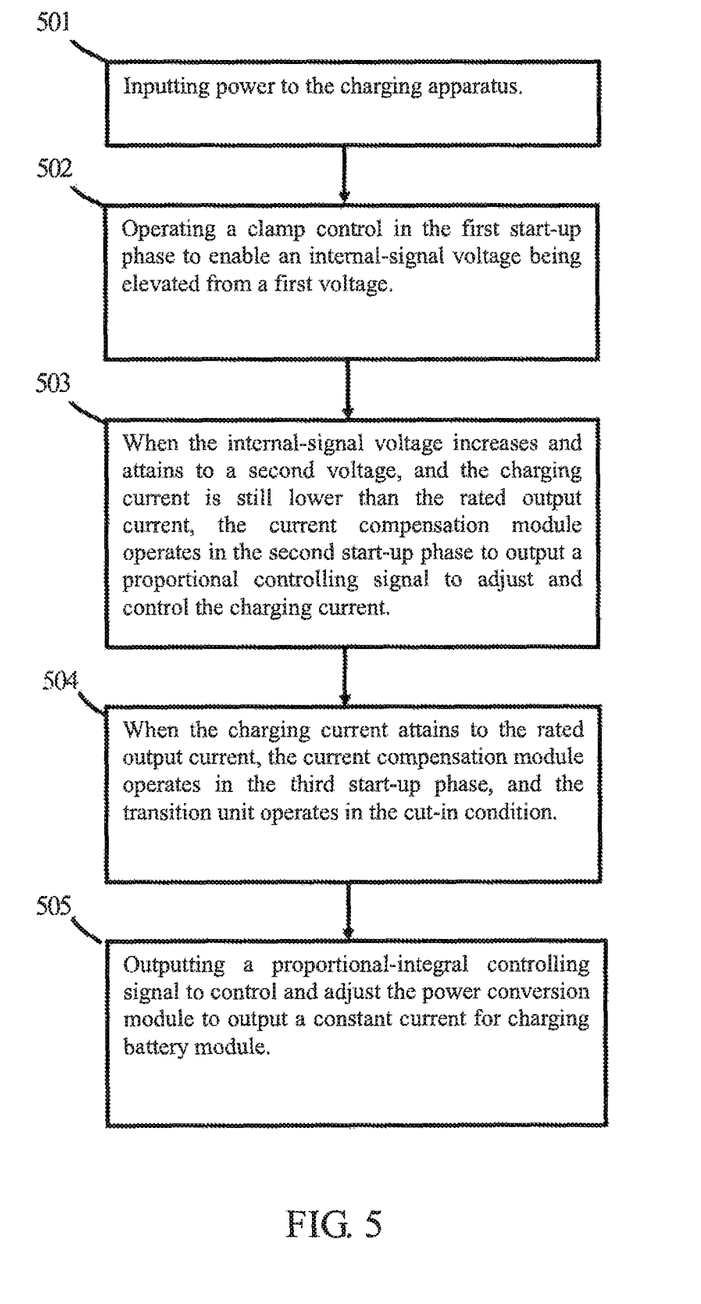
FIG. 5 is a flowchart which is the first embodiment of the charging apparatus controlling method for the present invention.

Despite the current compensation module and the controlling method are mentioned in the present invention; however, they are not limited to the aforementioned contexts, which include the illustrations in FIG. 3 and FIG. 5.

Figure 6:
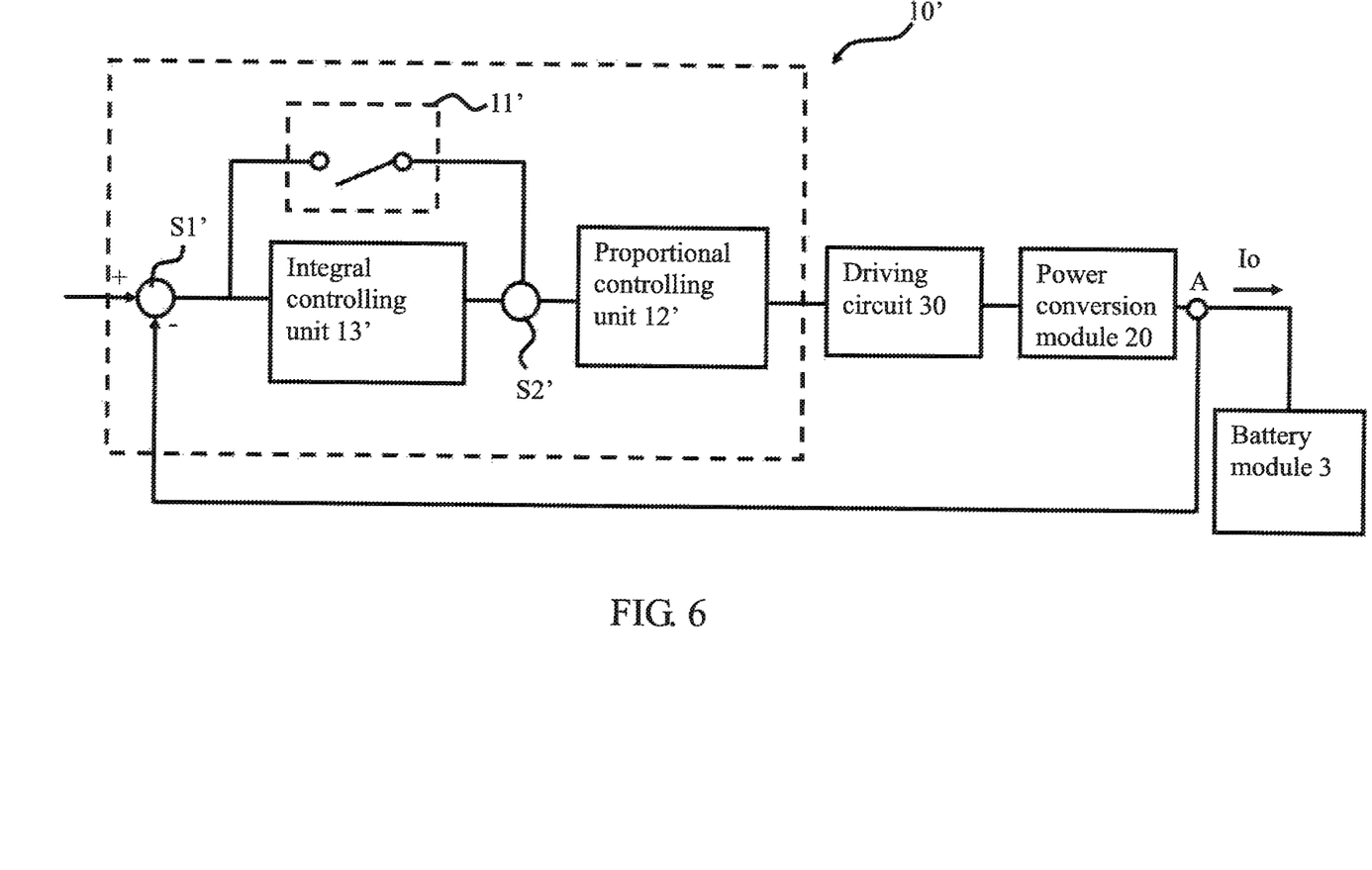
FIG. 6 is a diagram which is the second embodiment of the current compensation module for the present invention.

Please refer to FIG. 6, which is the diagram of the second embodiment of the current compensation module for the present invention. Please also refer to FIG. 4, the waveform diagram is the output power and the control signal of the charging apparatus for the present invention.

In the second embodiment for the present invention, a current compensation module 10' is also a feedback compensator, which can be either implemented by an analog circuit or a digital-control scheme, and that the present invention is not limited hereto. In the second embodiment, in order to fulfill the control and compensations through the current compensation module 10', the operations of charging apparatus 1 that have a first start-up phase T1, a second start-up phase T2, and a third start-up phase T3 in the start-up phase, can be discussed later. The current compensation module 10' comprises a transition unit 11', a proportional controlling unit 12', an integral controlling unit 13', and conjunction points S1' and S2'. The transition unit 11' may be a diode, but the present invention is not limited hereto. Based on the operative characteristics of the transition unit 11' and the operation principle of the current compensation module 10', there has an operation of the clamping control in the start-up phase, particularly when the charging apparatus 1 in the first start-up phase T1 starts to output the charging current Io, the initial voltage of the internal signal in the current compensation module 10' will make the internal-signal voltage V1 to clamp at a first voltage Vf, wherein the first voltage Vf can be determined by the transition unit 11', because it is operated in the cut-in condition based on its operative characteristics and the circuit principle of the current compensation module 10'. Along with the gradual charging current Io increase, the internal-signal voltage V1 is also increased. In addition, when the charging current Io is still lower than the rated output current Imax of the power conversion module 20, the transition unit 11' operates in the cut-in condition based on its operative characteristics and the circuit principle of the current compensation module 10'. When the charging current Io attains to a first current Ia, the charging apparatus 1 is operated in the second start-up phase T2; meanwhile, the internal-signal voltage V1 attains to the second voltage Vref, and that the transition unit 11' can be still operated in the cut-in condition. So when the charging current Io attains to the rated output current Imax of the power conversion module 20, the charging apparatus 1 starts the operation in the third start-up phase T3; meanwhile, the transition unit 11' is operated in the cut-off condition based on its operative characteristics and the circuit principle of the current compensation module 10'.

The integral controlling unit 13' is connected to the transition unit 11' in parallel and both conjunction point S1' and S2'. In the start-up phase of the charging apparatus 1, the transition unit 11' can be operated in the cut-in condition based on its operative characteristics and the operation principle of the current compensation module 10'. With the charging current Io elevating, the internal-signal voltage V1 is gradually increased from the first voltage Vf. When the internal-signal voltage V1 attains to the second voltage Vref, the charging apparatus 1 operates in the second start-up phase T2; in the second start-up phase T2, the charging current Io is still lower than the rated output current Imax of the power conversion module 20, so the internal-signal voltage V1 is sustained in the second voltage Vref, because the current compensation modules 10 operates in the feedback condition. In this condition, the current compensation module 10' only employs the proportional controlling unit 12' to control the power conversion module 20. The output current Io of the power conversion module 20 has to be detected at the point A, and then to input to the conjunction point S1', so as to establish a feedback loop. Using this feedback loop, the proportional controlling unit 12' outputs a proportional controlling signal, so as to control and adjust the output current Io of the power conversion module 20. With the charging current Io is increased to the rated output current Imax of the power conversion module 20, the charging apparatus 1 operates in third start-up phase T3, and the transition unit 11' is operated in the cut-off condition based on its operative characteristics and the circuit principle of the current compensation module 10'; meanwhile, the integral controlling unit 13' incorporates with the proportional controlling unit 12', so the integral controlling and a proportional controlling signals are able to go through the conjunction point S2' to output a proportional controlling signal or a proportional-integral controlling signal, so as to control the power conversion module 20 through the driving circuit 30. According to abovementioned flows, the proportional controlling unit 12' incorporates with the integral controlling unit 13' to output the proportional-integral controlling signal through the driving circuit 30 to control the charging current Io of the power conversion module 20; therefore, the charging apparatus can supply a constant current for charging the battery module 3.

In the start-up phase of the charging apparatus 1, its output voltage Vo and output current Io are shown in FIG. 4. From the first start-up phase T1 to the third start-up phase T3, the output current Io of the power conversion module 20 will be increased following the elevated output voltage Vo. Therefore, the transition unit 11' and the proportional controlling unit 12' in the current compensation module 10' make the initial voltage of the internal signal V1 can be clamped in the first voltage Vf. Moreover, when the internal-signal voltage attains to the second voltage Vref, the proportional controlling unit 12' of the current compensation module 10' outputs a proportional controlling signal; meanwhile, the transition unit 11' is operated in the cut-in condition based on its operative characteristics and the circuit principle of the current compensation module 10'. Finally, in the third start-up phase T3, the current compensation module 10' operates condition that can be changed from the proportional control to the proportional-integral control, because the transition unit 11' is operated in the cut-in condition based on its operative characteristics and the circuit principle of the current compensation module 10'. Therefore, the power conversion module 20' allows outputting a rated output current Imax, which is a constant current to charge the battery module 3. In addition, the output overshoot current of the power conversion module 20 can be suppressed in the start-up phase, due to the aforementioned controlling processes and methods are employed.

According to the aforementioned descriptions, it is known that the transition units 11 and 11' can be connected to the integral controlling unit 13 or 13' in series or parallel based on the circuit topology of the current compensator 10 or 10'. In the same manner, the transition unit 11 and 11' can be connected to the proportional controlling unit 12 or 12' in parallel or series, but, the connection manner is not limited in the present invention.

Figure 7:
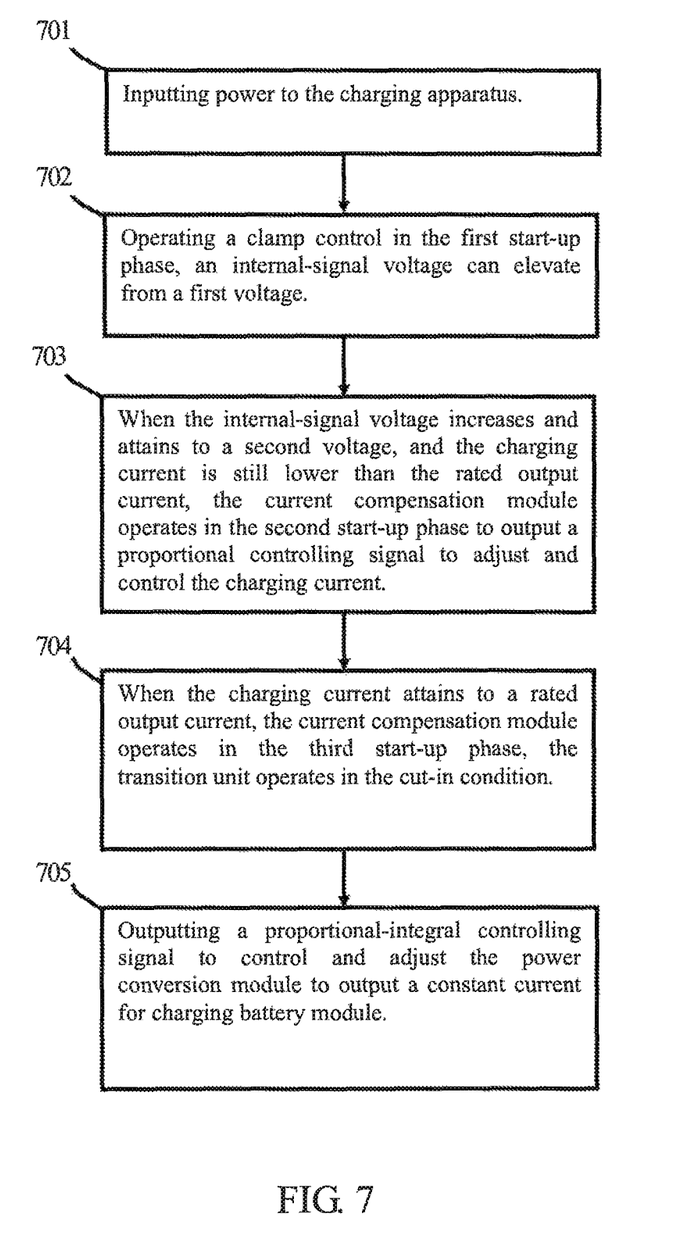
FIG. 7 is a flowchart which is the second embodiment of the charging apparatus controlling method for the present invention.

Finally, please refer to FIG. 7, which is the flowchart of the second embodiment of the charging apparatus controlling method for the present invention.

First of all, the apparatus performs Step 701: inputting power to the charging apparatus.

When the charging apparatus 1 operates in the start-up phase T1, an AC or a DC power which is from the power input terminal 2 can input the power conversion module 20. The power conversion module 20 outputs the charging power, which includes the charging voltage Vo and the charging current Io for charging the battery module 3.

Second of all, the apparatus performs Step 702: operating a clamp control in the first start-up phase, an internal-signal voltage can elevate from a first voltage.

In the first start-up phase T1, the charging apparatus 1 starts to output the charging current Io, and its current compensation module 10' is operated in clamping control condition because the transition unit 11' can be operated in the cut-in condition, based on its operative characteristics and the circuit principle of the current compensation module 10'. With the output current Io elevated, the initial voltage of the internal signals V1 in the current compensation module 10' starts increasing from the first voltage Vf.

Due to the aforementioned Steps 701 and 702 are similar to Step 501 and 502, they are not discussed here.

Third of all, the apparatus performs Step 703: when the internal-signal voltage increases and attains to a second voltage, and the charging current is still lower than the rated output current, the current compensation module operates in the second start-up phase to output a proportional controlling signal to adjust and control the charging current.

The internal-signal voltage V1 will increase along with the charging current Io elevating, the charging apparatus 1 can be operated in the second start-up phase T2, because the internal-signal voltage V1 in the current compensation module 10' is increased from the first voltage Vf to the second voltage Vref. In this second start-up phase T2, the output current Io of the power conversion module 20 is still lower than the rated output current Imax, therefore, the transition unit 11' is operated in the cut-in condition that allows the current compensation module 10' performs the proportional control by the proportional controlling unit 12'. Therefore, the proportional controlling signal through the driving circuit can control and adjust the output current Io of the power conversion module 20.

Fourth of all, the apparatus performs Step 704: when the charging current attains to a rated output current, the current compensation module operates in the third start-up phase, the transition unit operates in the cut-in condition.

When the output current Io increases to the rated output current Imax, the charging apparatus 1 operates in the third start-up phase T3, the transition unit 11' is operated in cut-off condition based on its operative characteristics and the circuit principle of the current compensation module 10'.

Finally, the system performs Step 705: outputting a proportional-integral controlling signal to control and adjust the power conversion module to output a constant current for charging the battery module.

When the transition unit 11' is operated in the cut-off condition, the integral controlling unit 13' incorporates with the proportional controlling unit 12' to output a proportional-integral controlling signal through the conjunction points S2', so as to implement the proportional-integral control process. Therefore, the current compensation module 10' outputs a proportional-integral controlling signal to control and adjust the output current Io of the power conversion module 20 for its steady-state operation, also in order to supply a constant charging current Io for charging the battery module 3.

Despite the current compensation module and the controlling method are mentioned in the present invention, they are not limited to the aforementioned contexts, which include the illustrated in FIG. 6 and FIG. 7.

The current compensation modules 10 or 10' and the charging apparatus 1 can operate in three phases during the start-up phase for the present invention, its control flows have a clamping control during the first start-up phase T1, the proportional control during the second start-up phase T2, and the proportional-integral control during the third start-up phase T3; according to the present invention, the charging apparatus 1 is able to prevent the power conversion module 20 from encountering the output overshoot current Io(ost). Furthermore, the current compensation module 10 or 10' employs a transition unit 11 or 11', whose operative characteristics and the operation principle of the current compensation module 10 or 10' can result in the clamping control, and that need not any controlling signals, triggering signals, or other controlling units to control and trigger its operations of the transition unit 11 or 11'.

As the described above, the objectives, means, and effectiveness of the present invention are different from the characteristics, schemes and methods in the prior art. It would be appreciated if the patent application could be issued as early as possible to benefit the society. It should be also noted that the embodiments described above are for illustrative purposes; the disclosed claims of the present invention should be within the range of the accompanying claims and should not be limited to the embodiments described above.

What is claimed is:

1. A current compensation module employed in a charging apparatus, so as to output a control signal to a driving circuit in order to adjust and control a charging current, which is outputted from a power conversion module to a battery module, wherein when the charging apparatus outputs the charging current, there can be operated in a first start-up phase, a second start-up phase, and a third start-up phase, the current compensation module comprising:

a transition unit, having an operation of a clamping control for implementing of the current compensation module and the charging apparatus, wherein when the charging apparatus is operated in the first start-up phase to output the charging current, the transition unit is employed for the operation of the clamping control, to make an internal-signal voltage in the current compensation module increasing from a first voltage;

a proportional controlling unit, electrically connected to the transition unit, wherein when the internal-signal voltage attains to a second voltage, and that the charging current is lower than a rated output current, the charging apparatus is operated in the second start-up phase, thus the proportional controlling unit will output a proportional controlling signal to control and adjust the charging output current of the power conversion module through the driving circuit; and an integral controlling unit, electrically connected to the proportional controlling unit and the transition unit, wherein when the charging current attains to the rated output current, the charging apparatus is operated in the third start-up phase, thus the integral controlling unit incorporates with the proportional controlling unit to output a proportional-integral controlling signal to control and adjust the power conversion module through the driving circuit, and to output a constant current to charge the battery module.

2. The current compensation module as claimed in claim 1, wherein the transition unit is connected to the integral controlling unit in series, wherein when the charging current is lower than the rated output current of the charging apparatus, the transition unit is operated in the cut-off condition; when the charging current attains to the rated output current, the transition unit is operated in the cut-in condition.

3. The current compensation module as claimed in claim 2, wherein when the transition unit is operated in the cut-in condition, the integral controlling unit incorporates with the proportional controlling unit to output the proportional-integral controlling signal, so as to control the power conversion module through the driving circuit.

4. The current compensation module as claimed in claim 1, wherein the transition unit is connected to the integral controlling unit in parallel, wherein when the charging current is lower than the rated output current, the transition unit is operated in the cut-in condition; when the charging current attains to the rated output current, the transition unit is operated in the cut-off condition.

5. The current compensation module as claimed in claim 4, wherein when the transition unit is operated in the cut-off condition, the integral controlling unit incorporates with the proportional controlling unit to output the proportional-integral controlling signal.

6. The current compensation module as claimed in claim 1, wherein the transition unit can be a diode.

7. The current compensation module as claimed in claim 1, wherein the current compensation module can be implemented by an analog circuit.

8. The current compensation module as claimed in claim 1, wherein the current compensation module can be implemented by a digital-control scheme.

9. A charging apparatus used for inputting an AC or a DC power from a power input terminal, and outputting a charging power for charging battery module, wherein when the charging apparatus outputs the charging current, there have three operative conditions in a first start-up phase, a second start-up phase, and a third start-up phase; the charging apparatus comprising:
- a power conversion module, electrically connected to the power input terminal for receiving the AC or the DC power to convert the charging power for charging the battery module;
- a driving circuit, electrically connected to the power converting module; and
- a current compensation module, electrically connected to the driving circuit, to output a control signal inputting the driving circuit, wherein the driving circuit is electrically connected to the power conversion module to make the current compensation module that can adjust and control a charging current of the power conversion module, the current compensation module comprising:
- a transition unit, having an operation of a clamping control for implementing the current compensation module and the charging apparatus, wherein when the charging apparatus is operated in the first start-up phase to output the charging current, the transition unit is employed for the operation of the clamping control, and to make an internal-signal voltage in the current compensation module can be increased from a first voltage;
- a proportional controlling unit, electrically connected to the transition unit, wherein when the internal-signal voltage attains to a second voltage, and that the charging current is lower than a rated output current of the power conversion module, the charging apparatus is operated in the second start-up phase, thus the proportional controlling unit will output a proportional controlling signal to control and adjust the output current of the power conversion module through the driving circuit; and
- an integral controlling unit, electrically connected to the proportional controlling unit and the transition unit, wherein when the charging current attains to the rated output current of the power conversion module, the charging apparatus and the current compensation module are operated in the third start-up phase, thus the integral controlling unit incorporates with the proportional controlling unit to output a proportional-integral controlling signal to control and adjust the output current of the power conversion module through the driving circuit to output a constant current for charging the battery module.

10. The charging apparatus as claimed in claim 9, wherein the transition unit is connected to the integral controlling unit in series, wherein when the charging current is lower than the rated output current of the power conversion module, the transition unit is operated in the cut-off condition; when the charging current attains to the rated output current, the transition unit is operated in the cut-in condition.

11. The charging apparatus as claimed in claim 10, wherein when the transition unit is operated in the cut-in condition, the integral controlling unit incorporates with the proportional controlling unit to output the proportional-integral controlling signal.

12. The charging apparatus as claimed in claim 9, wherein the transition unit is connected to the integral controlling unit in parallel, wherein when the charging current is lower than the rated output current of the power conversion module, the transition unit is operated in the cut-in condition; when the charging current attains to the rated output current, the transition unit is operated in the cut-off condition.

13. The charging apparatus as claimed in claim 12, wherein when the transition unit is operated in the cut-off condition, the integral controlling unit incorporates with the proportion controlling unit to output the proportional-integral controlling signal.

14. The charging apparatus as claimed in claim 9, wherein the transition unit can be a diode.

15. The charging apparatus as claimed in claim 9, wherein the current compensation module can be implemented by an analog circuit.

16. The charging apparatus as claimed in claim 9, wherein the current compensation module can be implemented by a digital-control scheme.

17. A charging apparatus controlling method is employed for a current compensation module in the charging apparatus to adjust and control a charging current of a power conversion module to charge a battery module, wherein when the charging apparatus outputs the charging current, there have three operative conditions in a first start-up phase, a second start-up phase, and a third start-up phase, the method comprising the steps as follow:
- operating a clamp control in the first start-up phase to enable an internal-signal voltage increase from a first voltage; wherein, the internal-signal voltage will be increased along with the increased charging current;
- when the increased internal-signal voltage attains to a second voltage, and the charging current is lower than a rated output current of the power conversion module, the current compensation module operates in the second start-up phase to output a proportional controlling signal in order to adjust and control the charging current; and
- when the charging current attains to the rated output current of the power conversion module, the current compensation module operates in the third start-up phase to output a proportional-integral controlling signal to adjust and control the power conversion module outputting a constant current, so as to charge the battery module.

18. The charging apparatus controlling method as claimed in claim 17, further comprising:
- when the charging current attains to the rated output current of the power conversion module, a transition unit can be operated in the cut-in condition; and
- when the transition unit is operated in the cut-in condition, outputting the proportional-integral controlling signal.

19. The charging apparatus controlling method as claimed in claim 17, further comprising:
- when the charging current attains to the rated output current of the power conversion module, a transition unit can be operated in the cut-off condition; and
- when the transition unit is operated in the cut-off condition, outputting the proportional-integral controlling signal.

20. The charging apparatus controlling method as claimed in claim 19, further comprising a step of using a diode to constitute the transition unit.

21. The charging apparatus controlling method as claimed in claim 17, further comprising a step of using an analog circuit to implement the current compensation module.

22. The charging apparatus controlling method as claimed in claim 17, further comprising a step of using a digital-control scheme to implement the current compensation module.

* * * * *